United States Patent
Disson et al.

(10) Patent No.: US 12,500,250 B2
(45) Date of Patent: Dec. 16, 2025

(54) METHOD FOR OPERATING A FUEL CELL DEVICE, THE FUEL CELL DEVICE, AND A MOTOR VEHICLE OUTFITTED WITH A FUEL CELL DEVICE

(71) Applicant: AUDI AG, Ingolstadt (DE)

(72) Inventors: Sebastian Disson, Waghäusel (DE); Leonard Liphardt, Mainhardt (DE); Keigo Suematsu, Neckarsulm (DE)

(73) Assignee: AUDI AG, Ingolstadt (DE)

( * ) Notice: Subject to any disclaimer, the term of this patent is extended or adjusted under 35 U.S.C. 154(b) by 363 days.

(21) Appl. No.: 18/044,760

(22) PCT Filed: Jan. 10, 2022

(86) PCT No.: PCT/EP2022/050296
§ 371 (c)(1),
(2) Date: Mar. 9, 2023

(87) PCT Pub. No.: WO2022/152632
PCT Pub. Date: Jul. 21, 2022

(65) Prior Publication Data
US 2023/0335764 A1    Oct. 19, 2023

(30) Foreign Application Priority Data
Jan. 12, 2021    (DE) ............... 10 2021 100 345.8

(51) Int. Cl.
*H01M 8/04119*    (2016.01)
*H01M 8/04223*    (2016.01)
(Continued)

(52) U.S. Cl.
CPC ... *H01M 8/04156* (2013.01); *H01M 8/04253* (2013.01); *H01M 8/04302* (2016.02);
(Continued)

(58) Field of Classification Search
CPC ......... H01M 8/04156; H01M 8/04253; H01M 8/04302; H01M 8/04303; H01M 8/04507;
(Continued)

(56) References Cited

U.S. PATENT DOCUMENTS

2006/0121322 A1* 6/2006 Haas ................. H01M 8/04303
429/429
2008/0318089 A1* 12/2008 Schneider ......... H01M 8/04574
429/483
(Continued)

FOREIGN PATENT DOCUMENTS

DE    102013225626 A1    6/2014
DE    102014223643 A1    1/2016
(Continued)

OTHER PUBLICATIONS

International Search Report, mailed Apr. 13, 2022, for International Patent Application No. PCT/EP2022/050296. (2 pages).
(Continued)

*Primary Examiner* — Christian Roldan
(74) *Attorney, Agent, or Firm* — Seed Intellectual Property Law Group LLP

(57) ABSTRACT

A method for operating a fuel cell device comprising a fuel cell stack having at least one fuel cell, involving the steps; a) drying of the fuel cell stack upon switching off the fuel cell device; b) determining the membrane residual water and the cathode residual water by means of electrochemical impedance spectroscopy when restarting the fuel cell device; c) using a cell voltage monitoring unit to identify the wettest cathode in one of the fuel cells; d) model-based determination of the water transport from the wettest cathode to the anode and thus the anode moisture in the fuel cell device; and; e) adjusting the electric current and the fuel volume flow in dependence on the anode moisture. A fuel cell device (Continued)

and a motor vehicle having a fuel cell device is also provided.

9 Claims, 2 Drawing Sheets

(51) Int. Cl.
| | |
|---|---|
| *H01M 8/04302* | (2016.01) |
| *H01M 8/04303* | (2016.01) |
| *H01M 8/04492* | (2016.01) |
| *H01M 8/04537* | (2016.01) |
| *H01M 8/04746* | (2016.01) |
| *H01M 8/04858* | (2016.01) |

(52) U.S. Cl.
CPC ... *H01M 8/04303* (2016.02); *H01M 8/04507* (2013.01); *H01M 8/04552* (2013.01); *H01M 8/04753* (2013.01); *H01M 8/0491* (2013.01)

(58) Field of Classification Search
CPC ......... H01M 8/04552; H01M 8/04753; H01M 8/0491; H01M 8/04291; H01M 8/045; H01M 8/04529; H01M 8/04641; Y02E 60/50
USPC .......................................... 429/414
See application file for complete search history.

(56) References Cited

U.S. PATENT DOCUMENTS

| | | | |
|---|---|---|---|
| 2012/0015263 A1* | 1/2012 | Suematsu | H01M 8/04559 |
| | | | 429/414 |
| 2016/0240875 A1* | 8/2016 | Rama | H01M 8/04761 |
| 2017/0045588 A1* | 2/2017 | Aoki | H01M 8/04992 |

FOREIGN PATENT DOCUMENTS

| | | |
|---|---|---|
| EP | 3588648 A1 | 1/2020 |
| EP | 3499620 B1 | 7/2020 |
| GB | 2518680 A | 4/2015 |
| WO | WO 2015044683 A1 | 4/2015 |

OTHER PUBLICATIONS

Written Opinion of the International Searching Authority, mailed Apr. 13, 2022, for International Application No. PCT/EP2022/050296. (5 pages)

Liu et al., "Localised electrochemical impedance spectroscopy investigation of polymer electrolyte membrane fuel cells using print circuit board based interference-free system," *Applied Energy* 254:1-11, Aug. 2019. (11 pages).

* cited by examiner

METHOD FOR OPERATING A FUEL CELL DEVICE, THE FUEL CELL DEVICE, AND A MOTOR VEHICLE OUTFITTED WITH A FUEL CELL DEVICE

BACKGROUND

Technical Field

This disclosure relates to a method for operating a fuel cell device comprising a fuel cell stack having at least one fuel cell.

The disclosure furthermore relates to a fuel cell device and a motor vehicle having a fuel cell device.

Description of the Related Art

Fuel cell devices are used for the chemical transformation of a fuel with oxygen to form water in order to create electric energy. For this, fuel cells contain as their key component the so-called membrane electrode assembly (MEA), which is an assemblage of a proton-conducting membrane and an electrode arranged on either side of the membrane (anode and cathode). Furthermore, gas diffusion layers (GDL) may be arranged on either side of the membrane electrode unit at the sides of the electrodes facing away from the membrane. In operation of the fuel cell device having a plurality of fuel cells assembled into a fuel cell stack, the fuel, especially hydrogen $H_2$ or a gas mixture containing hydrogen, is supplied to the anode, where an electrochemical oxidation of $H_2$ to $H^+$ takes place, giving off electrons. Through the electrolyte or the membrane which separates the reaction spaces from each other in gas-tight manner and electrically insulates them, a (water-bound or water-free) transport of the protons $H^+$ from the anode space to the cathode space occurs. The electrons provided at the anode are taken by an electrical line to the cathode. The cathode is supplied with oxygen or a gas mixture containing oxygen, so that a reduction of $O_2$ to $O^{2-}$ occurs, taking up electrons. At the same time, these oxygen anions react in the cathode space with the protons transported across the membrane to form water. This water must be removed from the fuel cell and the fuel cell stack, until a moisture level is reached which is needed for the operation of the fuel cell system.

Fuel cell devices therefore require a careful water management, since on the one hand it is necessary to prevent too much water being present in the fuel cell or in the fuel cell stack, resulting in blockage of the flow ducts for the supply of reactants. On the other hand, if there is too little water in the fuel cell, the proton conductivity of the membrane is limited, so that one must make sure to have adequate humidity and water supply for the membrane.

The problem is when frost conditions are present for a start of the fuel cell device, i.e., conditions in which water freezes. This can mean that the necessary flow ducts for the reactant gases and the product water are blocked with ice. The danger resulting from this is a hydrogen depletion, leading to irreversible damage in the electrode material.

A hydrogen depletion can be prevented by holding the minimal hydrogen stoichiometry at each site within the fuel cell stack at 1, for which the parameters of the electric current and the gas volume flow can be used. In order to properly set these parameters, the residual water content in the wettest anode must be determined before an electric current is drawn from the fuel cell stack.

The residual water content at the anode side is composed of the anode residual water, the membrane residual water and the cathode residual water. It is known how to dry the fuel cell stack upon shutdown of the fuel cell device, especially in the event of impending frost start conditions. In this way, the anode residual water content can be kept sufficiently low. However, a diffusion of the membrane residual water and the cathode residual water still occurs at the anode side and results in further anode residual water there.

EP 3 588 648 A1 likewise points out that the moisture level of a fuel cell greatly influences its operation. The moisture level correlates with the electrochemical impedance, so that by measuring this it is possible to determine and regulate the moisture level. A cell voltage monitoring unit (Cell Voltage Monitor CVM) is used to monitor the electrical potential of each individual fuel cell in the fuel cell stack. WO 2015/044683 A1 also describes how to use electrochemical impedance spectroscopy and a cell voltage monitoring unit to monitor the state of the fuel cell stack. Electrochemical impedance spectroscopy is used in the document DE 10 2013 225 626 A1 for fault diagnostics within a fuel cell stack.

BRIEF SUMMARY

Some embodiments provide a method for determining anode residual water, especially in preparation of a frost start of a fuel cell device, and to offer the possibility of carrying out this method.

Such a method, according to one embodiment, may include:
a) drying of the fuel cell stack upon switching off the fuel cell device,
b) determining the membrane residual water and the cathode residual water by electrochemical impedance spectroscopy when restarting the fuel cell device,
c) using a cell voltage monitoring unit to identify the wettest cathode in one of the fuel cells,
d) model-based determination of the water transport from the wettest cathode to the anode and thus the anode moisture in the fuel cell device, and
e) adjusting the electric current and the fuel volume flow in dependence on the anode moisture.

In some embodiments, it is possible not only to determine a mean residual water content of the entire fuel cell stack, but also the residual water content of the wettest cathode, from which the diffusion at the anode is determined on the basis of a model, using a water transport model, so that the residual water content in the wettest anode is also known, and the suitable parameters for restarting the fuel cell device can be determined for this.

The accuracy of the water transport model is improved if the model-based determining of the water transport takes into account the outdoor temperature upon restarting and/or the outdoor temperature upon shutdown and/or the downtime between shutdown and restarting.

If in adjusting the electric current and the fuel volume flow in dependence on the anode moisture the minimal hydrogen stoichiometry for the fuel cell with the wettest cathode is held at 1, it is assured that no hydrogen depletion will occur even at the most endangered fuel cell.

The water content of the membrane is determined by using a High Frequency Resistance (HFR) and/or the water content of the cathode electrode is determined by using a Low Frequency Resistance (LFR).

The aforementioned benefits and effects also hold accordingly for a fuel cell device and for a motor vehicle having a fuel cell device.

The features and combinations of features mentioned above in the description and the features and combinations of features mentioned below in the description of the figures and/or shown solely in the figures can be used not only in the particular indicated combination, but also in other combinations or standing alone. Thus, embodiments which are not shown explicitly or explained in the figures, yet which can be created and emerge from separated combinations of features from the explained embodiments should be viewed as also being disclosed.

BRIEF DESCRIPTION OF THE SEVERAL VIEWS OF THE DRAWINGS

Further benefits, features and details emerge from the claims, the following description of embodiments, and the drawings.

DETAILED DESCRIPTION

Figure 1:
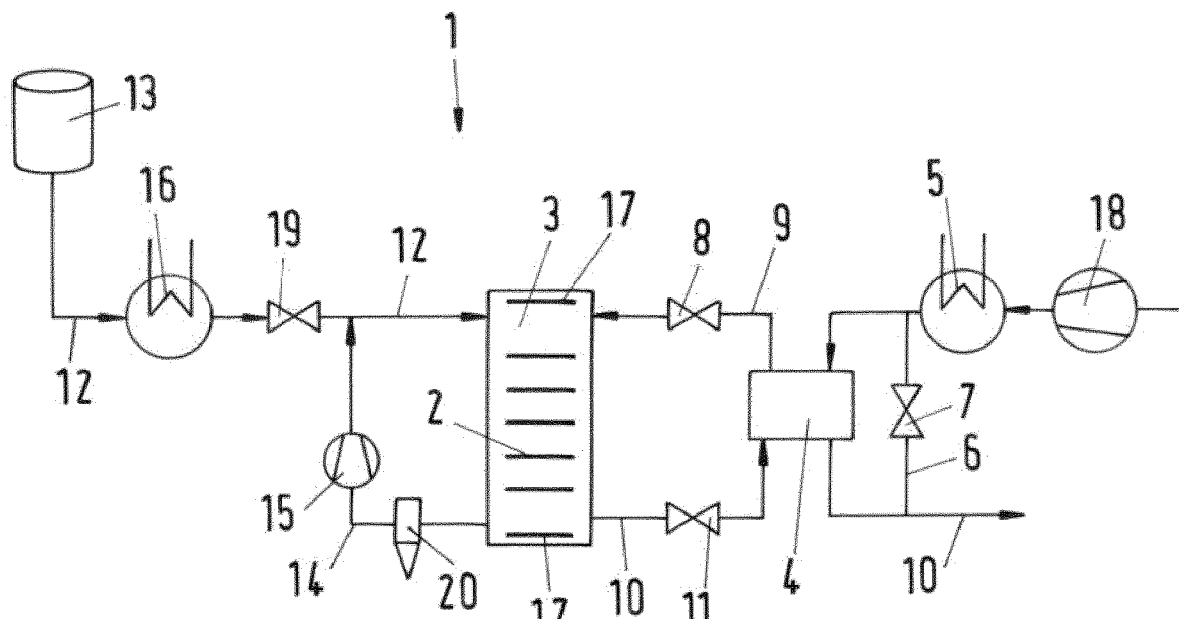
FIG. 1 shows a schematic representation of a fuel cell device.

FIG. 1 shows schematically a fuel cell device 1 comprising a plurality of fuel cells 2 assembled into a fuel cell stack 3.

Each of the fuel cells 2 comprises an anode 21, a cathode 22, as well as a proton-conducting membrane 23 separating the anode 21 from the cathode 22. Through an anode space, fuel can be supplied to the anode 21 (for example, hydrogen) from a fuel tank 13. In a polymer electrolyte membrane fuel cell (PEM fuel cell), fuel or fuel molecules are split into protons and electrons at the anode 21. The PEM lets through the protons but it is not permeable to the electrons. At the anode the following reaction occurs, for example: $2H_2 \rightarrow 4H^+ + 4e^-$ (oxidation/electron surrender). While the protons pass through the PEM to the cathode 22, the electrons are taken by an external circuit to the cathode 22 or to an energy accumulator.

Through a cathode space, the cathode 22 can be supplied with cathode gas (such as oxygen or air containing oxygen), so that the following reaction occurs at the cathode side; $O_2 + 4H^+ + 4e^- \rightarrow 2H_2O$ (reduction/electron uptake).

Since many fuel cells 2 are assembled in the fuel cell stack 3, a sufficiently large quantity of cathode gas must be provided, so that a large cathode gas mass flow or fresh gas flow is provided by a compressor 18, and the temperature of the cathode gas increases greatly on account of its being compressed. The conditioning of the cathode gas or the fresh air gas flow, i.e., its adjusting in terms of the desired temperature and humidity 26 in the fuel cell stack 3, occurs in an intercooler 5, situated downstream from the compressor 18, and a humidifier 4, situated downstream from the latter, bringing about a moisture saturation of the membranes 23 of the fuel cells 2 in order to boost their efficiency, since this favors the proton transport.

In order to avoid blockages due to frozen water of individual ducts for the reactant supply or blockages of fuel cells 2 upon restarting of a fuel cell device 1 under frost conditions with the attendant danger of an undersupply of hydrogen and thus irreversible damage in the electrode material, a method is carried out which starts at the shutdown of the fuel cell device 1 with a) drying of the fuel cell stack 3 so that the residual water content of the anodes 21 can be set very low and is known.

Then there follows when restarting the fuel cell device 1:b) determining the membrane residual water and the cathode residual water by means of electrochemical impedance spectroscopy, c) using a cell voltage monitoring unit to identify the wettest cathode 22 in one of the fuel cells 2, d) model-based determination of the water transport from the wettest cathode 22 to the anode 21 and thus the anode moisture in the fuel cell 2, and e) adjusting the electric current and the fuel volume flow in dependence on the anode moisture.

Thus, by suitable choice of the electric current withdrawn from the fuel cell stack 2 and the hydrogen volume flow supplied to the fuel cell stack 2, an undersupply of hydrogen can be avoided even for the fuel cell 2 with the wettest anode 21, and therefore the other anodes 21 in the fuel cell stack 3 are also adequately supplied. For this, the minimal hydrogen stoichiometry for the fuel cell 2 with the wettest cathode is held at 1 in adjusting the electric current and the fuel volume flow in dependence on the anode moisture.

Figure 2:
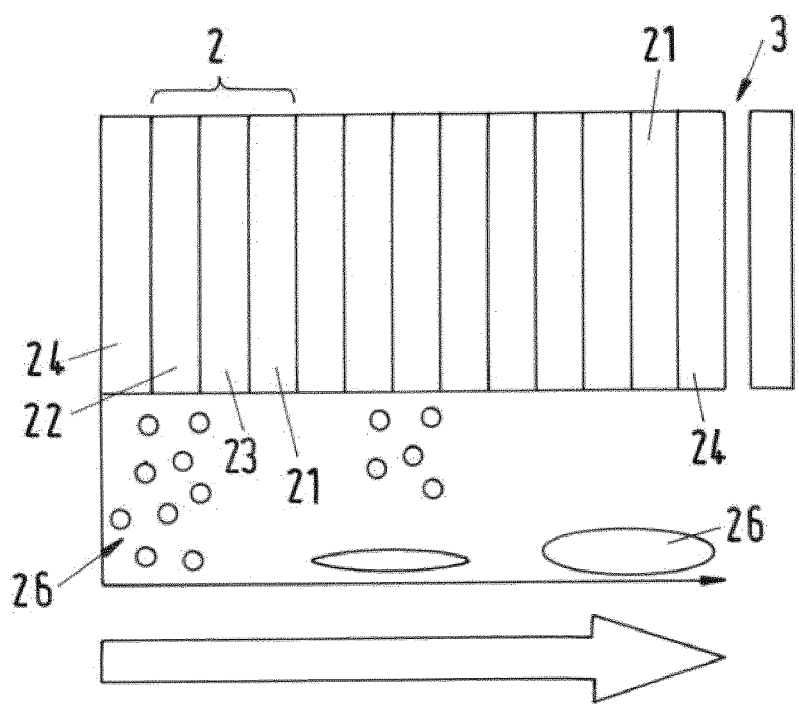
FIG. 2 shows a schematic representation of the temperature-driven water transport from the cathode to the anode in a fuel cell stack, with a symbolized temperature scale at right side, symbolizing a low temperature with light color.
Figure 3:
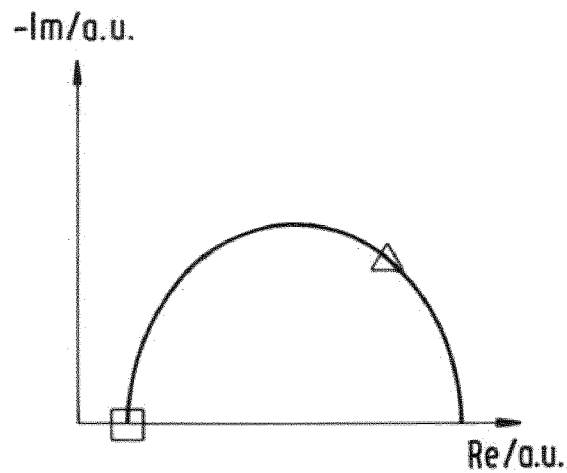
FIG. 3 shows a schematic representation of a Nyquist plot to explain the High Frequency Resistance (HFR) and the Low Frequency Resistance (LFR), shown for LFR at 200 Hz (triangle) and HFR at 1000 Hz (square).

FIG. 2 illustrates how the water transport from the cathode 22 to the anode 21 as symbolized by the arrow is temperature-dependent, so what the edge fuel cells 2 near the end plates 24 of the fuel cell stack 3 are more exposed to temperature changes. For the model-based determination of the water transport with improved accuracy, the outdoor temperature upon restarting is taken into account, as is the outdoor temperature upon shutdown and the downtime between shutdown and restarting.

Figure 4:
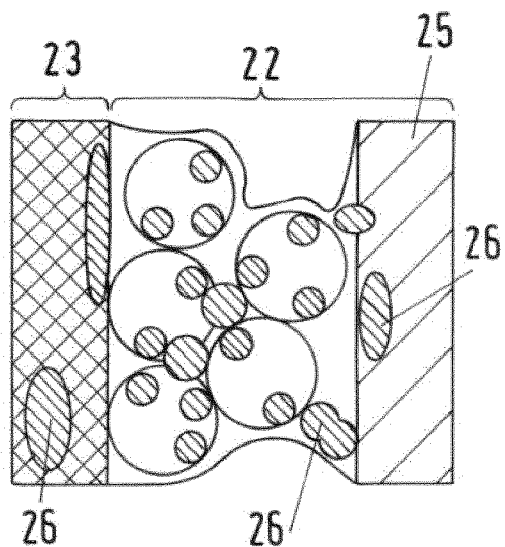
FIG. 4 shows a schematic representation to explain which component of a membrane electrode assembly is measured with HFR and LFR.
Figure 5:
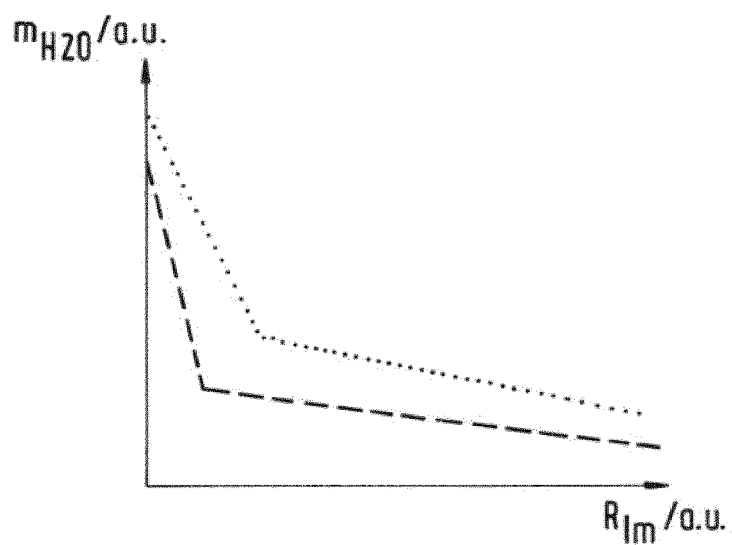
FIG. 5 shows a schematic representation of a correlation curve of the impedance dependency of the water mass for HRF (dotted line) and LFR (dashed line).

The water content, i.e., the moisture 26 of the membrane 23 may be determined by using a High Frequency Resistance (HFR) and the water content, i.e., the moisture of the cathode electrode may be determined by using a Low Frequency Resistance (LFR) (as shown in FIG. 4), while FIG. 5 shows the correlation between the water content and the HFR or LFR, respectively.

The fuel cell device 1 has a controller which is adapted to carry out the aforementioned method, and the fuel cell device 1 can also be used in a motor vehicle.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating a fuel cell device comprising a fuel cell stack having a plurality of fuel cells, the method comprising:

drying of the fuel cell stack upon switching off the fuel cell device;

determining a membrane residual water content and a cathode residual water content by electrochemical impedance spectroscopy when restarting the fuel cell device;

using a cell voltage monitoring unit to identify a wettest cathode in one of the plurality of fuel cells;

model-based determination of water transport from the wettest cathode to a corresponding anode and thus anode moisture in the fuel cell device; and adjusting an electric current and a fuel volume flow in dependence on the anode moisture.

2. The method according to claim 1, wherein the model-based determining of the water transport takes into account an outdoor temperature upon restarting.

3. The method according to claim 1, wherein the model-based determining of the water transport takes into account an outdoor temperature at shutdown.

4. The method according to claim 1, wherein the model-based determining of the water transport takes into account downtime between shutdown and the restarting.

5. The method according to claim 1, wherein in adjusting the electric current and the fuel volume flow in dependence on the anode moisture a minimal hydrogen stoichiometry for the fuel cell with the wettest cathode is held at 1.

6. The method according to claim 1, wherein the membrane residual water content is determined by using a High Frequency Resistance.

7. The method according to claim 1, wherein the cathode residual water content is determined by using a Low Frequency Resistance.

8. A fuel cell device, comprising:
a controller adapted to carry out the method according to claim 1.

9. A motor vehicle, comprising:
the fuel cell device according to claim 8.

* * * * *